(12) United States Patent
Endo

(10) Patent No.: US 6,278,940 B1
(45) Date of Patent: Aug. 21, 2001

(54) INPUT METHOD FOR SELECTING DESTINATION, NAVIGATION SYSTEM USING THE SAME, AND INFORMATION STORAGE MEDIUM FOR USE THEREWITH

(75) Inventor: Koichi Endo, Torrance, CA (US)

(73) Assignee: Alpine Electronics, Inc. (JP)

( * ) Notice: Subject to any disclaimer, the term of this patent is extended or adjusted under 35 U.S.C. 154(b) by 0 days.

(21) Appl. No.: 09/521,980

(22) Filed: Mar. 9, 2000

(51) Int. Cl.$^7$ ............................ G01C 21/00; G08G 1/123
(52) U.S. Cl. ............................ 701/209; 701/201; 701/208; 701/211; 701/25; 340/988; 340/990; 340/995
(58) Field of Search ............................ 701/200, 201, 701/202, 208, 209, 211, 22, 23, 25; 340/988, 990, 995

(56) References Cited

U.S. PATENT DOCUMENTS

| | | | |
|---|---|---|---|
| 5,680,312 | * 10/1997 | Oshizawa et al. | 701/202 |
| 5,819,200 | 10/1998 | Tamai et al. | 701/208 |
| 5,825,306 | * 10/1998 | Hiyokawa et al. | 340/988 |
| 5,920,172 | * 7/1999 | Bauer | 318/587 |
| 6,064,322 | * 5/2000 | Ohira | 340/995 |

* cited by examiner

Primary Examiner—William A. Cuchlinski, Jr.
Assistant Examiner—Yonel Beaulieu
(74) Attorney, Agent, or Firm—Brinks Hofer Gilson & Lione

(57) ABSTRACT

A destination input method and apparatus in which points of interest in an input category are listed and displayed, and a destination is input by selecting a destination point of interest from the listed points of interest. The input method of the apparatus includes the steps of displaying a point of interest belonging to a business chain in the list of points of interest by a representative name of the business chain, displaying a list of the branches of the business chain when the representative name is selected, and selecting a destination point of interest from the list of the branches of the business chain.

18 Claims, 6 Drawing Sheets

INPUT METHOD FOR SELECTING DESTINATION, NAVIGATION SYSTEM USING THE SAME, AND INFORMATION STORAGE MEDIUM FOR USE THEREWITH

BACKGROUND OF THE INVENTION

1. Field of the Invention

The present invention relates to input methods for selecting destinations in navigation systems, and more particularly relates to an input method for selecting a destination in which when a category of the destination is input, a list of "points of interest" is displayed, whereby the destination may be input by selecting the "point of interest" (POI) of the desired destination from the POI list.

2. Description of the Related Art

A navigation system, which guides a driver so as to easily reach a desired destination, determines the current location of a vehicle and reads map data for the vicinity of the vehicle from a map information storage medium, such as a CD-ROM or a DVD (digital versatile disc). After a pause, in a "MAP GUIDE MODE", a map image and travel routes are drawn on a display with a vehicle position mark (representing the current position of the vehicle) superposed thereon at a predetermined position in the map image. As the current location of the vehicle changes due to the travel of the vehicle, the vehicle position mark is caused to move along the travel route. Alternatively, the map image is scrolled while the vehicle position mark remains fixed at a predetermined position. Therefore, the detailed map image for the vicinity of the vehicle is displayed and can be understood at a glance.

In an "ARROW GUIDE MODE", the travel routes as well as the roads intersecting therewith are schematically shown. An arrow, which represents a direction of travel at an intersection, is also shown. Furthermore, the distance to an intersection, the direction of the destination, the distance to the destination and the like are shown. In addition, the direction of travel at an intersection is given by a synthesized voice instruction.

In order to be guided along a route using the "MAP GUIDE MODE" or the "ARROW GUIDE MODE", path finding to the destination must be performed by first inputting the name of the destination. This input method requires, for example, use of:

(1) a method of directly inputting the address of the destination;

(2) a method of inputting a desired intersection by specifying two streets when the destination is an intersection;

(3) a method of inputting the POI place name of the destination;

(4) a method of selecting the place name of the destination from a list of possible displayed "place names" based on the input of a POI place type (category) of the destination;

(5) a method of selecting the name of the destination from among the names of the most recent "n" number of destinations;

(6) a method of selecting the name of the destination from among the names of the POIs pre-registered in an "address book";

(7) a method of inputting the destination by directly pointing to the position of the destination on the map image using a cursor;

(8) a method of inputting a POI telephone number of the destination; or the like.

In order to input the destination using method (4), the main menu is displayed on a monitor by operating a menu key of a remote control unit (FIG. 6A), and menu item "Dest" is selected from the main menu. This allows the navigation system to display the "Find Destination by" menu (FIG. 6B) for specifying an input method for selecting the destination. When menu item "Point of Interest" is selected, the navigation system displays the "Find Point of Interest by" menu containing items "Place Name" and "Place Type" (FIG. 6C). Menu item "Place Type" is selected. This allows the navigation system to display "Select Category" menu showing a list of the categories (FIG. 6D). When a category (for example, "SHOPPING") is selected from the category list, the navigation system displays an "alphanumeric keyboard" (FIG. 6E) for entering the name of a city. When the user types the first several letters of the name of the city using the above keyboard, a list of the names of the cities which begin with the same first several letters is displayed so the entries in the list can be scrolled through. The name of the desired city (for example, Costa Mesa) is selected from the list. Alternatively, the name of the desired city is entered by typing in the full name. By inputting the name of the city, a POI list which is specified by the category (shopping) as well as specified by the city (Costa Mesa) is displayed so that the entries in the list can be scrolled through (FIG. 6F). When the desired POI (for example, Triangle Square) is selected from the POI list, the name, the address, the telephone number and the like of the selected POI are shown (FIG. 6G). When the selected POI is the destination, "OK to Proceed" is selected. Accordingly, the selected POI is determined to be the destination. Thereafter, the navigation system finds and displays navigating routes from the current location to the destination.

A conventional navigation system shows POIs of a selected category in order of increasing distance from the current location of the vehicle when a category (a bank, a hotel, an "automatic teller machine" (ATM), an airport, and the like) is selected. When a category (for example, "fast-food restaurant") having branches is selected, every business chain classified as a "fast-food restaurant", such as "McDonald's" or "Burger King", is shown in order of increasing distance from the current location of the vehicle.

Accordingly, when many chain stores exist, because of the number of the entries in the POI list, numerous scrolling operations may be required to find the desired POI, which decreases the operability of the navigation system. In addition, when a user stays at a hotel which is two hundred miles away from the current location, because hotels are shown in order of increasing distance from the current location, numerous scrolling operations may be required to find the desired POI, which decreases the operability of the navigation system.

SUMMARY OF THE INVENTION

Accordingly, it is an object of the present invention to provide an input method for selecting the destination in a navigation system so as to facilitate selection of a desired POI by decreasing the number of POIs shown on a monitor when the POIs corresponding to a selected category are shown.

It is another object of the present invention to provide an input method for selecting the destination in a navigating system so as to facilitate input of a desired POI by showing a POI list in the language-based order (for example, in alphabetical order) or in the order of distance in accordance with a selected category.

To this end, according to a first aspect of the invention, there is provided a destination input method in which points of interest in an input category are listed and displayed and a destination is input by selecting a destination point of interest from the listed points of interest. The input method includes the steps of displaying a point of interest belonging to a business chain in the list of points of interest by the representative name of the business chain, displaying a list of the branches of the business chain when the representative name is selected, and selecting a destination point of interest from the list of the branches of the business chain.

According to a second aspect of the invention, there is provided a destination input method in which points of interest in an input category are listed and displayed, and a destination is input by selecting a destination point of interest from the listed points of interest. The input method includes the steps of predetermining whether points of interest are to be displayed in one of the order of distance and the language-based order for each category of the point of interest, displaying the list of points of interest in one of the order of distance and the language-based order in accordance with an input category and inputting the destination by selecting the destination point of interest from the list of points of interest.

According to a third aspect of the invention, there is provided an information storage medium for a navigation system which uses a destination input method for listing points of interest belonging to an input category to be displayed, whereby a destination is input by selecting a destination point of interest from the list of points of interest. The input method includes the steps of predetermining whether the points of interest are to be displayed in one of the order of distance and the language-based order for each category of the point of interest, displaying the list of points of interest in one of the order of distance and the language-based order in accordance with an input category and inputting the destination by selecting the destination point of interest from the list of points of interest.

According to a fourth aspect of the invention, there is provided an information storage medium for a navigation system in which a destination input method lists and displays points of interest belonging to an input category, whereby a destination is input by selecting a destination point of interest from the list of points of interest. The input method includes the steps of displaying a point of interest belonging to a business chain in the list of points of interest by the representative name of the business chain, displaying a list of the branches of the business chain when the representative name is selected, and selecting a destination point of interest from the list of the branches of the business chain.

According to a fifth aspect of the invention, there is provided a navigation system displaying a list of points of interest in an input category, whereby a destination is input by selecting a destination point of interest from the list of points of interest. The navigation system includes a list producing unit displaying a point of interest belonging to a business chain in the list of points of interest by the representative name of the business chain, and displaying a list of the branches of the business chain when the representative name is selected, and an input unit for selecting a destination point of interest from the list of the branches of the business chain.

According to a sixth aspect of the invention, there is provided a navigation system displaying a list of points of interest in an input category, whereby a destination is input by selecting a destination point of interest from the list of points of interest. The navigation system includes a point of interest database predetermining whether the points of interest are to be displayed in one of the order of distance and the language-based order for each category of the point of interest, a list producing unit producing the list of points of interest in one of the order of distance and the language-based order in accordance with an input category, and an input unit for inputting the destination by selecting the destination point of interest from the list of points of interest.

Other features and advantages of the present invention will be apparent from the following description taken in conjunction with the accompanying drawings.

DESCRIPTION OF THE PREFERRED EMBODIMENTS

Figure 1:
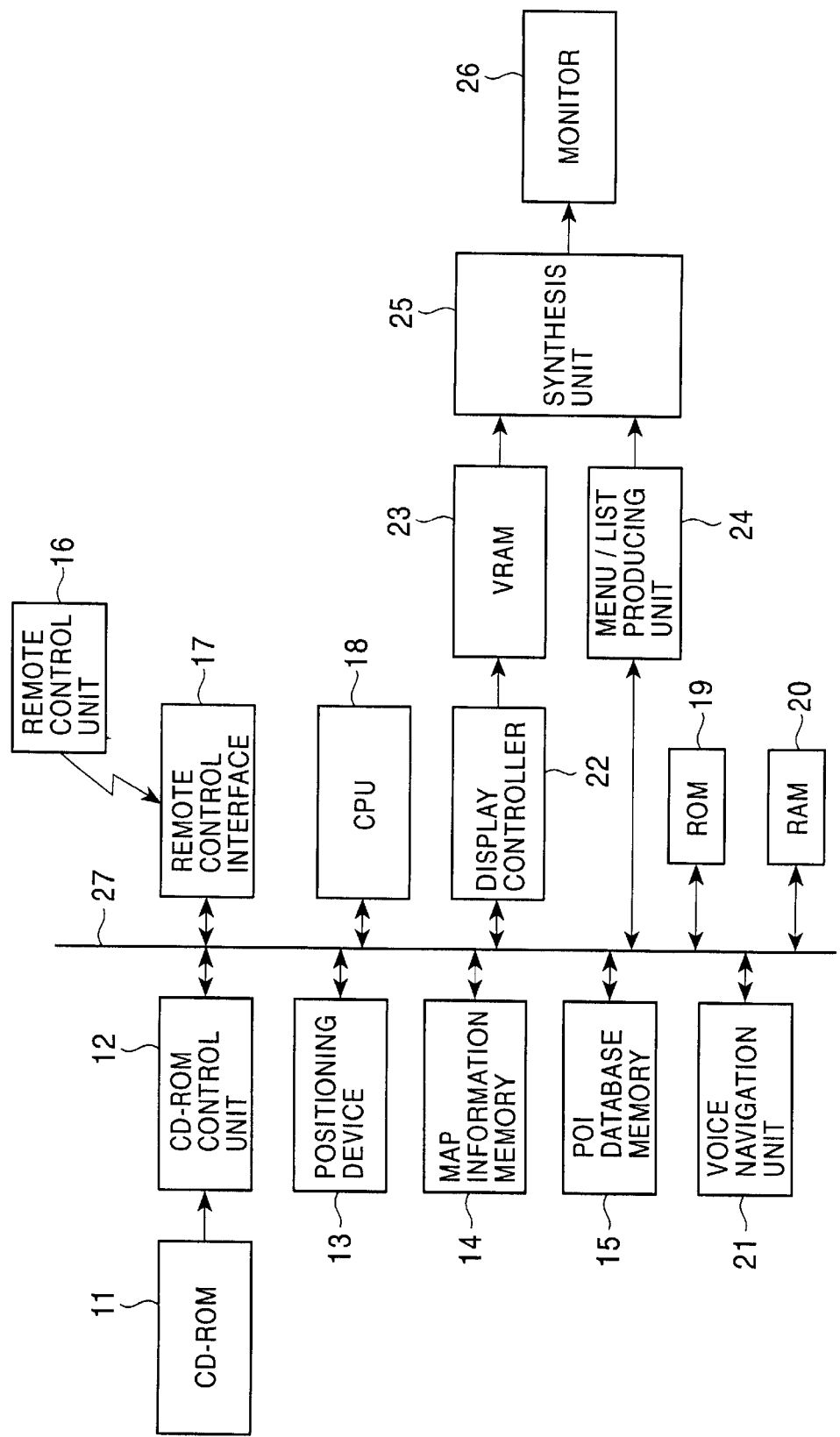
FIG. 1 is a block diagram of a navigation system according to an embodiment of the present invention.

FIG. 1 shows a construction of a navigation system according to the present invention. A map information storage medium 11, for example a CD-ROM, stores map information; a CD-ROM control unit 12 controls a process for reading map information from the CD-ROM; a positioning device 13 locates the current location of the vehicle, and includes a distance sensor for determining traveled distance, a gyroscope for detecting travel direction, a central processing unit (CPU) for computing the location of the vehicle, a global positioning system (GPS) receiver, and the like; map information memory 14 stores map information read from the CD-ROM; and POI database memory 15 stores POI database information read from the CD-ROM.

Figure 2:
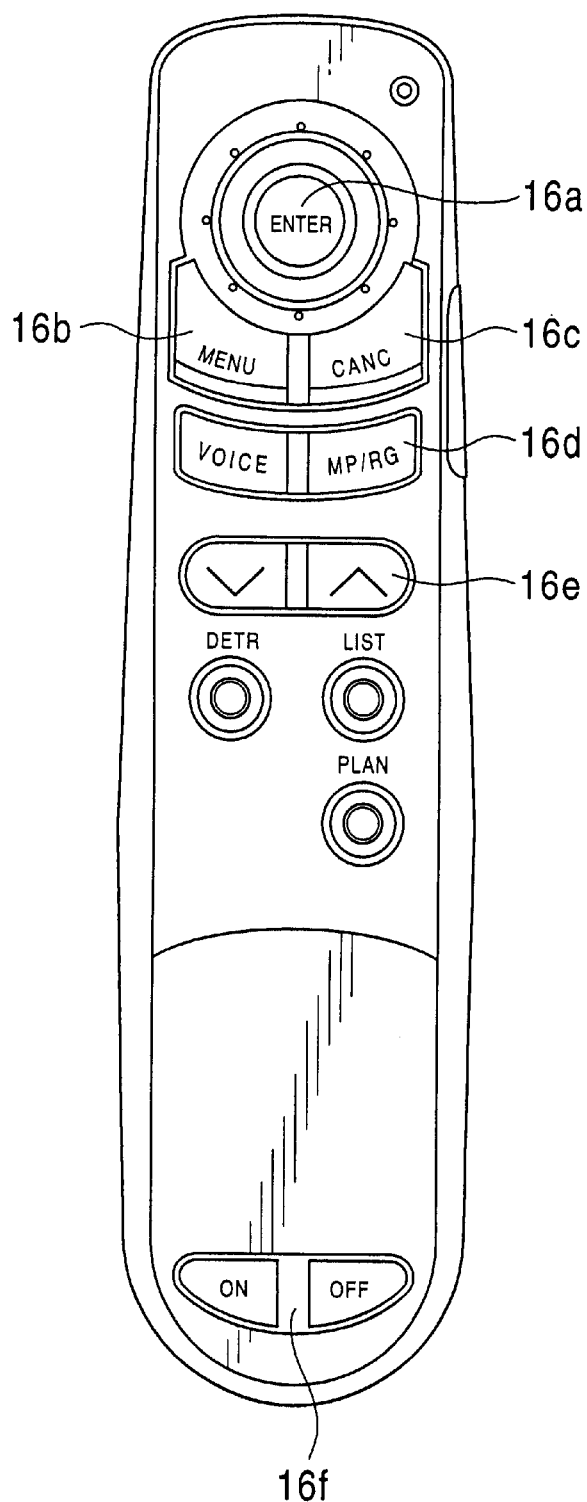
FIG. 2 is an illustration of a remote control unit.

A remote control unit 16 performs menu selecting operations, zoom-in/zoom-out operations, destination input operations and the like. A remote control interface 17 is an interface between the remote control unit 16 and the navigation system. As shown in FIG. 2, the remote control unit 16 includes a pointing-stick/enter key 16a, a menu key 16b, a cancel key 16c, an MP/RG key 16d, a zoom/scroll key 16e, a monitor-on/off key 16f and the like. The pointing-stick/enter key 16a functions as a pointer which allows a cursor, a vehicle mark or the like to move in eight directions on the map image, or which allows a highlighted region to move when a desired menu item is being selected. Furthermore, the pointing-stick/enter key 16a functions as the enter key for entering the position of the cursor as well as selecting and entering the desired menu item. The menu key 16b is operated when a main menu is displayed. The cancel key 16c is operated so as to cancel display of the present screen or return to the previous screen. An MP/RG key 16e is operated so as to switch over between "MAP GUIDE MODE" and "ARROW GUIDE MODE". A zoom/scroll key 16f is operated when zoom-in/zoom-out operations on the map image, shifting operation of a highlighted region in a list, or a scrolling operation in a list is performed.

Referring back to FIG. 1, a CPU 18 controls the entire navigation system; a read-only memory 19 stores various types of control programs; a random-access memory (RAM) 20 stores results of processing, such as travel routes; a voice-guidance unit 21 voices a travelling direction at an intersection; a display controller 22 generates a "MAP GUIDE" image or an "ARROW GUIDE" image based on the map information; a video RAM 23 stores images generated by the display controller; a menu/list producing unit 24 produces menu images and various types of list images; a synthesizing unit 25 produces a screen image showing on a monitor 26 based on the menu image, the map image, and the like; and a bus 27 exchanges data between the above devices.

Figure 3:
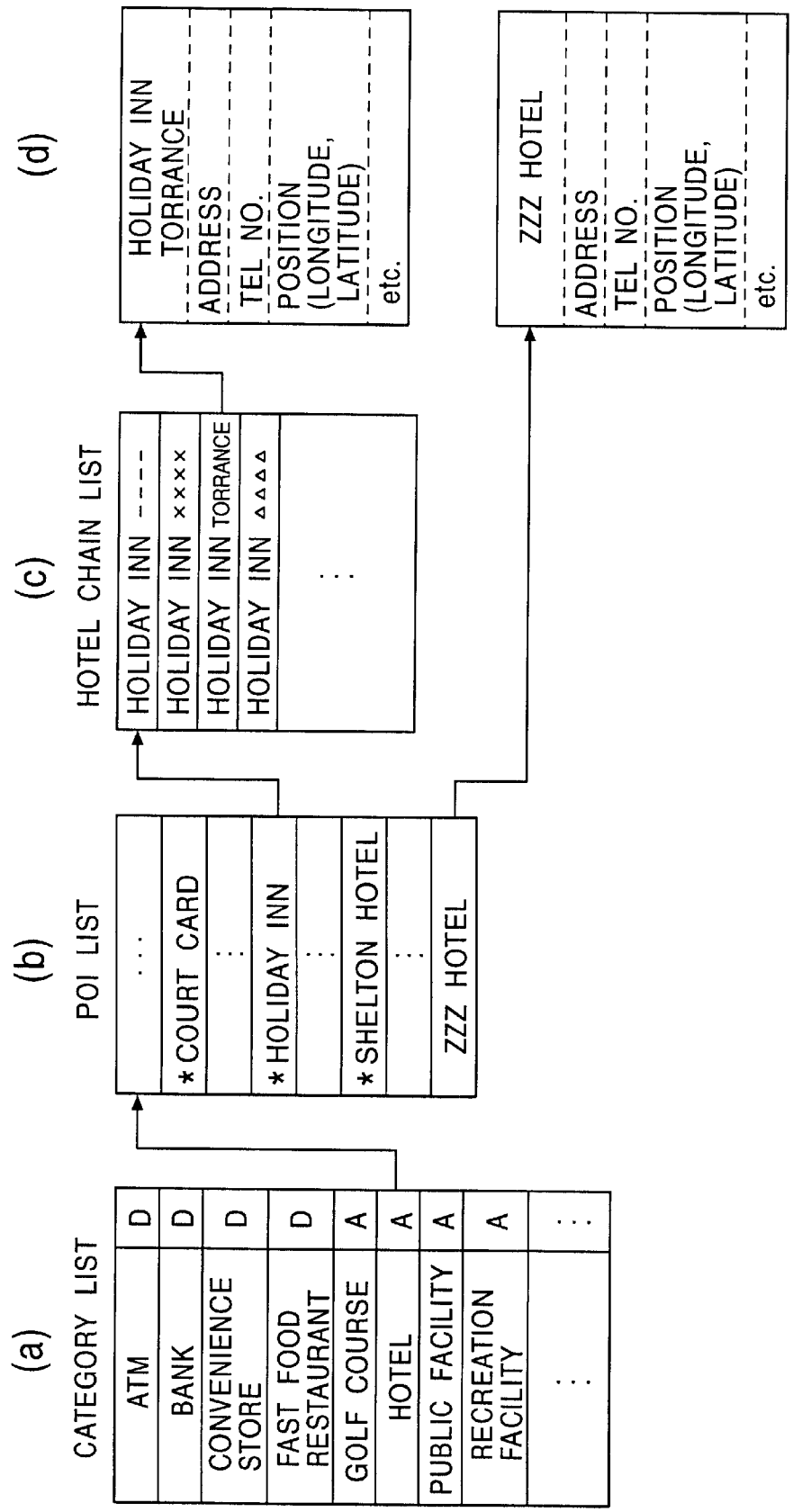
FIGS. 3A to 3D are an illustration of the data structure of a POI database.

The POI database memory 15 stores a number of POIs by relating each POI with a corresponding category, such as hotels, restaurants, airports, stations, stores, sports facilities, hospitals, and golf courses. The POI database memory 15 furthermore stores the address, telephone number, longitude/latitude coordinates, category, and the like of each POI. FIG. 3A shows one example of a category list; FIG. 3B shows one example of the POI list which belongs to the category "hotels"; FIG. 3C shows one example of a list of hotels in a particular hotel chain; and FIG. 3D shows one example of detailed information of each branch or each POI.

When the POI list is displayed on the monitor 26, the category list shown in FIG. 3A contains flag information for each entry as to whether a POI list is shown in the order of distance (represented by "D" in FIG. 3A) or in a language-based order (for example, an alphabetical order) (represented by "A" in FIG. 3A). In the POI list in FIG. 3B, a POI which belongs to a business chain is displayed by the representative name of the business chain. Whether or not the POI belongs to a business chain can be determined by the presence of the mark "*" in the POI list. When a POI does not belong to a business chain, the entry in the POI list representing the POI directly links to the detail information list of the POI in FIG. 3D, instead of linking to the chain store list in FIG. 3C.

Figure 4:
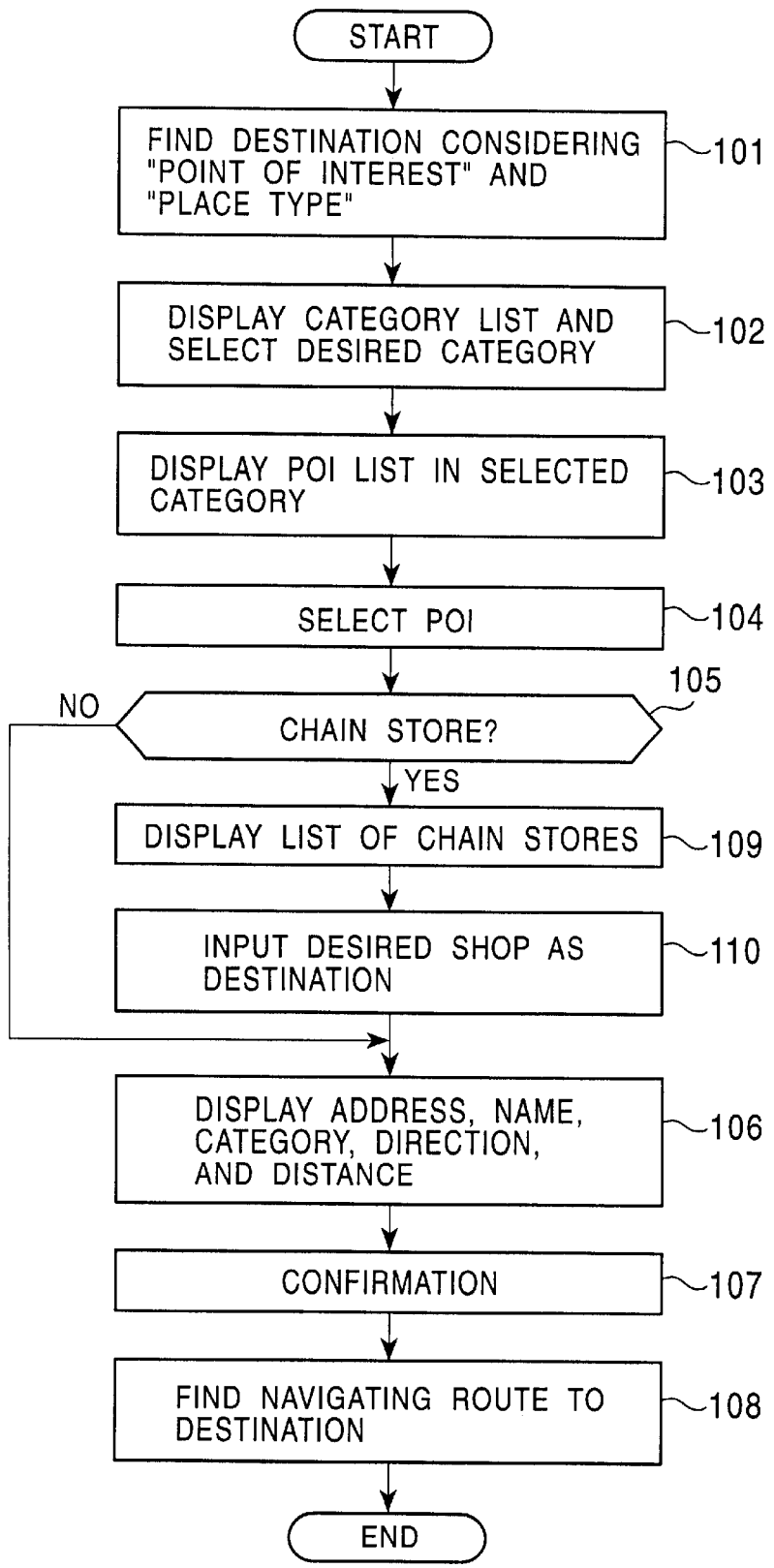
FIG. 4 is a first process flow chart of inputting the destination according to the present invention.

FIG. 4 shows a first process flow for entering the destination according to the present invention.

Figure 6A:
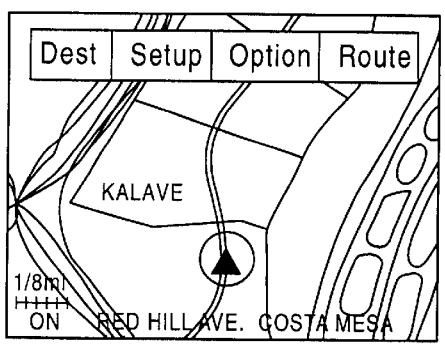
FIGS. 6A to 6G are examples of menus illustrating an operation of inputting the destination based on the category of a POI.
Figure 6B:
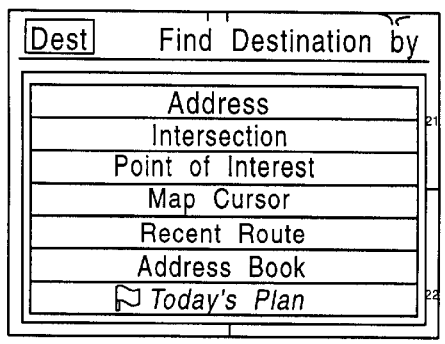
Figure 6C:
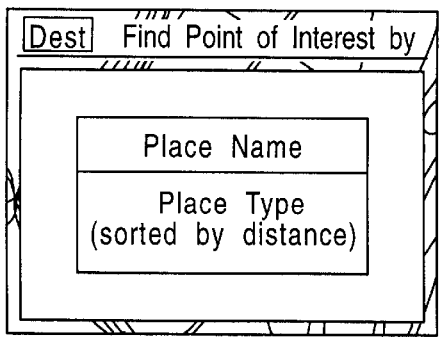
Figure 6D:
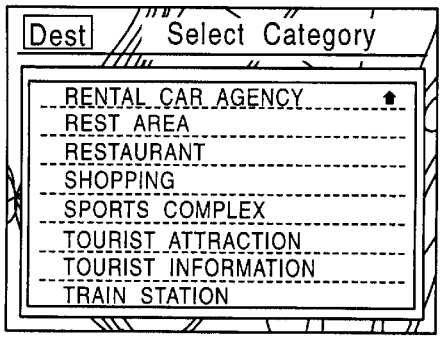
Figure 6E:
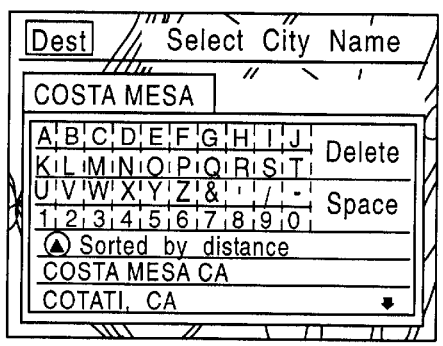
Figure 6F:
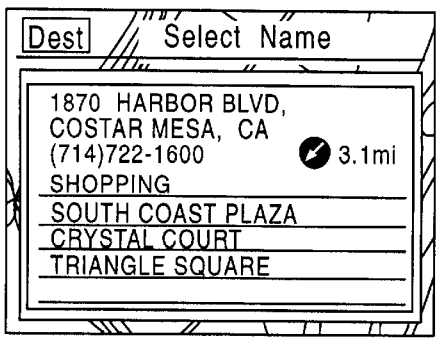
Figure 6G:
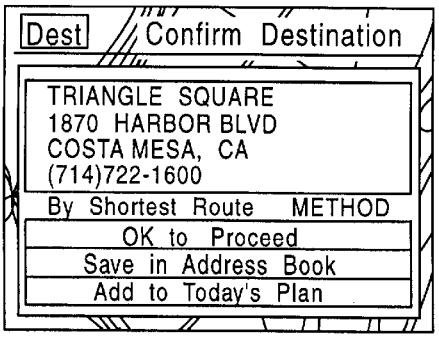

Destination-finding is instructed to be performed using finding options of "POI" and "Place Type" (step 101). Because the navigation system displays the category list on the monitor 26 in response to the above instruction (FIG. 6D), the user selects the desired category (step 102). The navigation system displays a list of the POIs in the selected category in the order of distance or in alphabetical order so that the entries in the list can be scrolled through. In this case, a POI which belongs to a business chain is displayed by the representative name of the business chain.

The user selects the desired POI by scrolling so that the desired POI is displayed (step 104). The navigation system queries the POI database information as to whether or not the POI belongs to a business chain (step 105).

When the POI does not belong to a business chain, detailed information, such as the address, name, category, arrow pointing to the position of the POI, distance to the POI, are shown (step 106). In step 106, the direction and the distance are calculated based on the current location of the vehicle and the position of the POI. When the selected POI is confirmed to be the destination (step 107), path finding is performed using the selected POI as the destination (step 108).

On the other hand, when the POI belongs to a business chain (step 105), a list of the chain stores of the business chain is displayed so that the entries in the list can be scrolled through (step 109). When the desired chain store (POI) is selected by scrolling so that the desired POI is displayed (step 110), detailed information of the selected chain store (POI), such as the address, name, category, arrow pointing to the position of the POI, and distance to the POI, is displayed (step 106). Thereafter, when the selected chain store is confirmed to be the destination (step 107), path finding is performed using the selected POI as the destination (step 108).

For example, when "fast-food restaurant" is selected from the category menu, since only the representative name of a business chain is displayed in the POI list, "McDonald's", "Burger King" and the like have a single entry in the POI list by the representative names thereof. When the user selects "McDonald's" from the POI list, the chain store list of "McDonald's" is shown in order of increasing distance from the current location of the vehicle.

Because the representative name of a business chain is shown in a POI list, the number of displayed POIs is decreased, which facilitates the selection of the desired POI. In addition, because the list of the chain stores of the business chain is displayed by selecting a representative name, the input of the desired chain store as the destination is facilitated.

Figure 5:
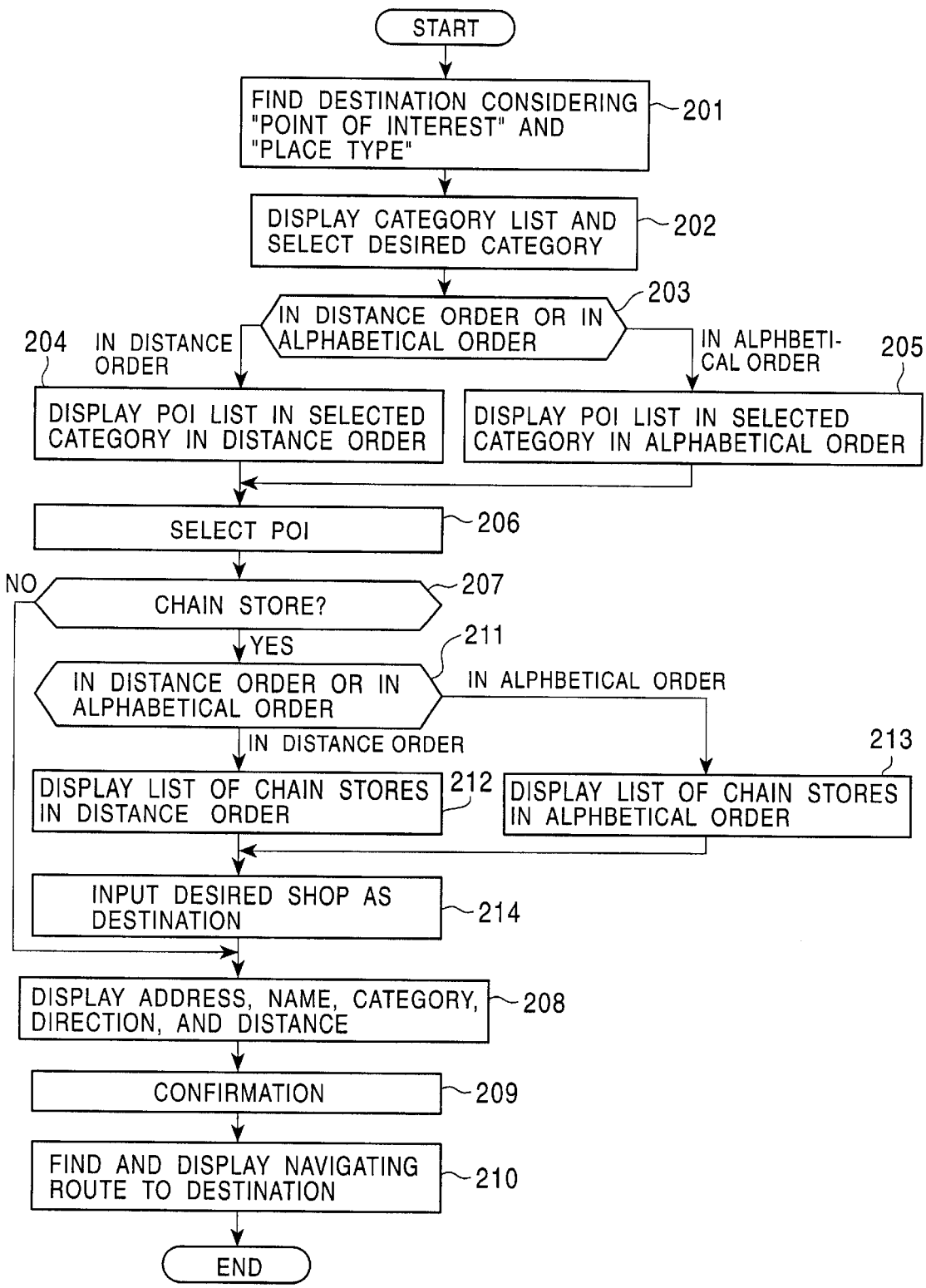
FIG. 5 is a second process flow chart of inputting the destination according to the present invention.

FIG. 5 shows a second process flow for entering the destination according to the present invention.

Destination-finding is instructed to be performed using finding options of "POI" and "Place Type" (step 201). Because the navigation system displays the category list on the monitor 26 in response to the above instruction (FIG. 6D), the user selects the desired category (step 202). When the category is selected, the navigation system determines whether the POI list is displayed in the order of distance or in language-based order (alphabetical order) based on flags contained in the selected category (step 203). The POI list is displayed in the order of distance by sorting the POI, is which belong to the selected category in the order of distance. The distance between the current location of the vehicle and the location of each POI can be calculated based on location data of each POI and current position data of the vehicle (longitude, latitude) (step 204).

On the other hand, the POI list is displayed in alphabetical order by sorting the POIs which belong to the selected category in alphabetical order (step 205). When the POI list is displayed, the business chains are displayed by the representative names thereof in the POI list.

The user selects the desired POI by scrolling so that the desired POI is display (step 206). The navigation system determines whether or not the name of the desired POI is the representative name of a business chain by querying the POI database information (step 207).

When the name of the desired POI is not the representative name of a business chain, detailed information of the desired POI, such as the address, name, category, arrow pointing to the position of the POI, and distance to the POI, is displayed (step 208). The POI is confirmed to be the destination (step 209). Path finding is performed using the desired POI as the destination (step 210).

On the other hand, when it is determined at step 207 that the name of the desired POI is the representative name of a business chain, it is determined whether the POI list is displayed in the order of distance or in language-based order (alphabetical order) in the same manner as was determined in step 203 (step 211).

When the POI list is displayed in the order of distance, a list of the chain stores is displayed in the order of distance so that the entries in the list can be scrolled through (step 212). When the POI list is displayed in alphabetical order, the list of the chain stores is displayed in alphabetical order so that the entries in the list can be scrolled through (step 213).

The user selects the desired chain store (POI) by scrolling so that the desired POI is displayed (step 214). Detailed information of the POI, such as the address, name, category, arrow pointing to the position of the POI, and distance to the POI, is displayed (step 208). The POI is confirmed to be the destination (step 209). Path finding is performed using the desired POI as the destination (step 210).

For example, it is preferable that a POI list be displayed in the order of distance when the category is ATMs, banks, fast-food restaurants, convenience stores, and the like. In contrast, it is preferable that a POI list be displayed in alphabetical order when the category is hotels, public facilities, recreation facilities, golf courses, and the like. According to the present invention, when the user has a reservation to stay at a hotel (for example, Holiday Inn, Torrance), "hotels" is selected from the category menu. The list of names of hotels is displayed in alphabetical order in which hotel chains are displayed by the representative name thereof. Accordingly, when, for example, "Holiday Inn" (the representative name) is selected, the names of the hotels in the chain are displayed, not in the order of distance, but in alphabetical order. As a result, even if the desired hotel is far away, the selection of the desired hotel as the destination is facilitated by simplified operations.

As described above, a POI list is shown in the order of distance or in alphabetical order in accordance with the selected category, which facilitates the selection of the desired POI.

As many different embodiments of the present invention can be made without departing from the spirit and scope thereof, it is to be understood that the invention is not limited to the specific embodiments described above, but is defined in the appended claims.

What is claimed is:

1. A destination input method in which points of interest in an input category are listed and displayed, and a destination is input by selecting a destination point of interest from the listed points of interest, the input method comprising:

displaying a point of interest belonging to a business chain in the list of points of interest by a representative name of the business chain;

displaying a list of the branches of the business chain when the representative name is selected; and selecting a destination point of interest from the list of the branches of the business chain.

2. A destination input method according to claim 1, further comprising performing path finding using the selected point of interest as the destination.

3. A destination input method according to claim 1, wherein the business chain is one of a hotel and a fast-food restaurant.

4. A destination input method in which points of interest in an input category are listed and displayed, and a destination is input by selecting a destination point of interest from the listed points of interest, the input method comprising:

predetermining whether points of interest are to be displayed in one of the order of distance and language-based order for each category of the point of interest;

displaying the list of points of interest in one of the order of distance and language-based order in accordance with an input category; and inputting the destination by selecting the destination point of interest from the list of points of interest;

wherein a point of interest belonging to a business chain is displayed in the list of Points of interest by a representative name of the business chain.

5. A destination input method according to claim 4, further comprising performing path finding using the selected point of interest as the destination.

6. A destination input method according to claim 4, wherein the list of points of interest is displayed in one of the order of distance and language-based order so that the entries therein are scrollable.

7. A destination input method according to claim 4, wherein the list of points of interest displayed in language-based order is one of a list of hotels, a list of public facilities, a list of recreation facilities, and a list of golf courses.

8. A destination input method according to claim 4, wherein the list of points of interest displayed in the order of distance is one of a list of automatic teller machines, a list of banks, a list of fast-food restaurants, and a list of convenience stores.

9. A destination input method according to claim 4, wherein a point of interest belonging to a business chain is displayed in the list of points of interest by a representative name of the business chain, and wherein when said representative name of the business chain is selected, a list of the branches of the business chain is displayed in one of the order of distance and language-based order.

10. An information storage medium for a navigation system using a destination input method for listing points of interest belonging to an input category on a display, wherein a destination is input by selecting a destination point of interest from the list of points of interest, the input method comprising:

predetermining whether the points of interest are to be displayed in one of the order of distance and language-based order for each category of the points of interest;

displaying the list of points of interest in one of the order of distance and language-based order in accordance with an input category; and inputting the destination by selecting the destination point of interest from the list of points of interest;

wherein a point of interest belonging to a business chain is displayed in the list of points of interest by a representative name of the business chain.

11. An information storage medium for a navigation system in which a destination input method lists and displays points of interest belonging to an input category, wherein a destination is input by selecting a destination point of interest from the list of points of interest, the input method comprising:

displaying a point of interest belonging to a business chain in the list of points of interest by a representative name of the business chain;

displaying a list of the branches of the business chain when said representative name is selected; and selecting a destination point of interest from said list of the branches of the business chain.

12. An information storage medium for a navigation system according to claim 11, wherein when the point of interest belonging to the business chain is selected, information about direction, a pointing arrow, and distance to the selected point of interest are displayed.

13. An information storage medium for a navigation system according to claim 11, wherein when a point of interest belonging to the business chain is selected, a list of branches corresponding to the selected business chain is displayed so that the entries therein are scrollable.

14. An information storage medium for a navigation system according to claim 13, wherein when a point of interest is selected from said list of branches corresponding to the selected business chain, name, address, and category of the selected point of interest are displayed.

15. A navigation system displaying a list of points of interest in an input category for selecting a destination point of interest from the list of points of interest, the navigation system comprising:

a list producing unit displaying a point of interest belonging to a business chain in the list of points of interest by a representative name of the business chain, and displaying a list of the branches of the business chain when said representative name is selected; and an input unit selecting a destination point of interest from said list of the branches of the business chain.

16. A navigation system according to claim 15, further comprising path finding means for performing path finding using the selected point of interest as the destination.

17. A navigation system displaying a list of points of interest in an input category for selecting a destination point of interest from the list of points of interest, the navigation system comprising:

a point of interest database predetermining whether the points of interest are to be displayed in one of the order of distance and language-based order for each category of the point of interest;

a list producing unit producing the list of points of interest in one of the order of distance and language-based order in accordance with an input category; and an input unit for inputting the destination by selecting the destination point of interest from the list of points of interest;

wherein said list producing unit displays a point of interest belonging to a business chain in the list of points of interest by a representative name of the business chain, and wherein when said representative name is selected, a list of the branches of the business chain is displayed in one of the order of distance and language-based order.

18. A navigation system according to claim 17, further comprising path finding means for performing path finding using the selected point of interest as the destination.

* * * * *